US012793384B2

(12) United States Patent
Kim et al.

(10) Patent No.: US 12,793,384 B2
(45) Date of Patent: Nov. 10, 2026

(54) CONVERSION MODEL CONSTRUCTION DEVICE AND METHOD, AND IMAGE MATCHING DEVICE AND METHOD USING SAME

(71) Applicant: SEOUL NATIONAL UNIVERSITY R&DB FOUNDATION, Seoul (KR)

(72) Inventors: Do-Nyun Kim, Seoul (KR); Yun Hyoung Nam, Seoul (KR); Tae-Yeon Kim, Seoul (KR); Jae Hoon Kim, Seoul (KR)

(73) Assignee: SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 201 days.

(21) Appl. No.: 18/920,517

(22) Filed: Oct. 18, 2024

(65) Prior Publication Data

US 2025/0046056 A1 Feb. 6, 2025

Related U.S. Application Data

(63) Continuation of application No. PCT/KR2023/013118, filed on Sep. 4, 2023.

(30) Foreign Application Priority Data

Sep. 5, 2022 (KR) ........................ 10-2022-0111861

(51) Int. Cl.
*G06V 10/74* (2022.01)
*G06V 10/20* (2022.01)
(Continued)

(52) U.S. Cl.
CPC .......... *G06V 10/761* (2022.01); *G06V 10/255* (2022.01); *G06V 10/752* (2022.01);
(Continued)

(58) Field of Classification Search
CPC ........ G06N 3/045; G06N 3/088; G06N 3/094; G06N 3/0475; G06N 7/01; G06N 3/0464;
(Continued)

(56) References Cited

U.S. PATENT DOCUMENTS

2019/0294970 A1* 9/2019 Fidler .................. G06F 18/214
2019/0295302 A1* 9/2019 Fu .......................... G06V 10/82

FOREIGN PATENT DOCUMENTS

KR 10-2055877 B1 12/2019
KR 10-2073361 B1 2/2020
(Continued)

OTHER PUBLICATIONS

D. Kim and B.-W. Hong, "Unsupervised Segmentation incorporating Shape Prior via Generative Adversarial Networks," 2021 IEEE/CVF International Conference on Computer Vision (ICCV), Montreal, QC, Canada, 2021, pp. 7304-7314 (Year: 2021).*
(Continued)

*Primary Examiner* — Alex S Liew
(74) *Attorney, Agent, or Firm* — Bridgeway IP Law Group, PLLC; Jihun Kim

(57) ABSTRACT

A conversion model construction device updates a generation module to process a first training image of a first type into a conversion image by using a separation outline module, updates the generation module to process the conversion image into a shape of a second training image of a second type by using a shape inference module, and trains the conversion model by updating the generation module such that the conversion image is determined as a real image by a discriminator module. The separation outline module separates a polygon of an input image from a background and distinguishes an outline, the shape inference module compares a border shape of a polygon included in the first image with a border shape of a polygon included in the
(Continued)

second image and the discriminator module determines whether the input image is a real image or a fake image according to the set condition.

31 Claims, 17 Drawing Sheets

(51) Int. Cl.

| | |
|---|---|
| ***G06V 10/75*** | (2022.01) |
| ***G06V 10/77*** | (2022.01) |
| ***G06V 10/778*** | (2022.01) |
| ***G06V 10/82*** | (2022.01) |

(52) U.S. Cl.
CPC ...... *G06V 10/7715* (2022.01); *G06V 10/7792* (2022.01); *G06V 10/82* (2022.01)

(58) Field of Classification Search
CPC ........ G06N 3/084; G06N 3/0895; G06N 3/09; G06N 3/0455; G06N 3/0442; G06N 3/048; G06N 3/049; G06N 3/096; G06N 3/047; G06F 16/2358; G06F 18/2155; G06F 2218/08; G06F 2218/12; G06F 18/214; G06F 18/217; G06F 18/22; G06F 16/2282; G06V 10/764; G06V 10/82; G06V 20/41; G06V 20/46; G06V 20/48; G06V 10/242; G06V 10/75; G06V 20/20; G06V 20/647; G06V 30/226; G06V 30/32; G06V 30/40; G06V 40/103
See application file for complete search history.

(56) References Cited

FOREIGN PATENT DOCUMENTS

| | | | |
|---|---|---|---|
| KR | 10-2020-0080409 | A | 7/2020 |
| KR | 10-2317992 | B1 | 10/2021 |
| KR | 10-2021-0150970 | A | 12/2021 |
| WO | 2021199018 | A1 | 10/2021 |

OTHER PUBLICATIONS

International Search Report of PCT/KR2023/013118 dated Nov. 30, 2023.

Nam, Yunhyoung et al., "Precise Pattern Alignment for Die-to-Database Inspection Based on the Generative Adversarial Network. ", IEEE Transactions on Semiconductor Manufacturing, vol. 35, No. 3, 2022, pp. 532-539.

Nam, Yunhyoung, "Automated alignment of semiconductor lithography patterns using deep generative model for metrology and inspection." Doctor of Engineering thesis, Mechanical and Aerospace Engineering, Multiscale, The Graduate School Seoul National University. Aug. 2022.

* cited by examiner

200

CONVERSION MODEL CONSTRUCTION DEVICE AND METHOD, AND IMAGE MATCHING DEVICE AND METHOD USING SAME

CROSS-REFERENCE TO RELATED APPLICATION

The application is a continuation of PCT/KR2023/013118 filed on Sep. 4, 2023, which claims priority to Korean Patent Application No. 10-2022-0111861 filed on Sep. 5, 2022, in the Korean Intellectual Property Office, the entire contents of which are incorporated herein for all purposes by this reference.

BACKGROUND

The present disclosure relates to a technology for determining whether images of different types match each other, and relates to an image matching device and method for determining whether images of different types match each other by converting images of different types into one type.

A method for matching images of different types without using an artificial intelligence algorithm has low accuracy due to a difference between images such as noise, a difference in image style, and a difference in shape.

In addition, a method for matching images of different types by using a supervised learning algorithm, representatively a generative adversarial network (GAN) algorithm, converts one image type among images of different types into another image type and then aligns the image. Since a method using supervised learning requires accurately matched training data for training a conversion model, human management and supervision are required, and since the degree of misalignment of training data is reflected in a conversion model, the accuracy of a conversion result may be reduced in an inference process.

When training a conversion model by using training data consisting of misaligned image pairs (patterns between images of different types included in the training data may include some aligned pairs, and no pairs may be aligned) between images of different types, there are limitations in that patterns are not generated at a correct position or not generated with a corresponding pattern shape, noise is generated, the generated image style is changed to a different type, or a conversion model has to be trained by using multiple generators and discriminators. In addition, there is a problem that a conversion model may not be utilized in the process of aligning images of different types because the conversion model is not trained in the process of transforming the type of image.

In addition, a method for measuring similarity between images of different types by using an artificial intelligence learning algorithm includes a method for measuring the similarity by comparing pixel values of images, a method for measuring the similarity by extracting an outline of a pattern from each image and directly comparing pixel values by using the outline, and so on.

The method for measuring similarity between images has several limitations, and accordingly, it is difficult to measure similarity between images due to a lot of noise in images or a difference in an image style. In addition, there is difficulty in finding the same feature between images of different types and difficulty in similarly constructing a descriptor that describes the feature, and also, there is difficulty in measuring similarity due to different shapes of polygonal patterns included in images.

Therefore, a technology that may overcome the limitations is required.

SUMMARY

The present disclosure provides a device and method for constructing a conversion model trained to transform an image of a first type into an image of a second type by using first training data of a first type and second training data of a second type.

In addition, the present disclosure provides an image matching device and method for transforming a first image of a first type into a second image of a second type by using a conversion model, and determining whether the second image matches a third image of the second type.

However, technical objects to be achieved by the present embodiments are not limited to the technical objects described above, and there may be other technical objects.

According to an aspect of the present disclosure, a conversion model construction device for constructing a conversion model for converting a type of an image includes a memory storing a conversion model construction program, and a processor configured to execute the conversion model construction program, wherein the conversion model construction program updates a generation module to process a first training image of a first type into a conversion image by using a separation outline module, updates the generation module to process the conversion image into a shape of a second training image of a second type by using a shape inference module, and trains the conversion model by updating the generation module such that the conversion image is determined as a real image by a discriminator module according to a condition set by the discriminator module, the conversion model includes the generation module, the separation outline module, the shape inference module, and the discriminator module, the separation outline module separates at least one polygon included in an input image from a background and distinguishes an outline of the at least one polygon, the shape inference module, when the first image of the first type and the second image of the second type are input, compares a border shape of a polygon included in the first image with a border shape of at least one polygon included in the second image to determine whether the border shape of the polygon matches the border shape of the at least one polygon, and the discriminator module determines whether at least one input image is a real image or a fake image according to the set condition.

According to another aspect of the present disclosure, a conversion model construction method of converting a type of an image by using a conversion model construction device includes updating a generation module to process a first training image of a first type into a conversion image by using a separation outline module, updating the generation module to process the conversion image into a second type by using a second training image of a second type and a shape inference module, and updating the generation module such that the conversion image is determined as a real image by a discriminator module according to a condition set by the discriminator module, wherein the conversion model includes the generation module, the separation outline module, the shape inference module, and the discriminator module, the separation outline module separates at least one polygon included in an input image from a background and distinguishes an outline of the at least one polygon, the shape inference module, when the first image of the first type and the second image of the second type are input, compares a border shape of a polygon included in the first image with a border shape of at least one polygon included in the second image to determine whether the border shape of the polygon matches the border shape of the at least one polygon, and the discriminator module determines whether at least one input image is a real image or a fake image according to the set condition.

According to another aspect of the present disclosure, an image matching device for determining whether images of different types match to each other includes a memory storing an image matching program, and a processor configured to execute the image matching program, wherein the image matching program generates a second image of a second type by applying a first image of a first type of an object to a conversion model and determines whether the second image matches a third image of the second type according to an image matching condition, the object is manufactured by using the third image, the conversion model is machine-trained through a generation module, a separation outline module, a shape inference module, and a discriminator module to convert the first image of the first type into the second image of the second type, the generation module processes the first image of the first type, the separation outline module separates at least one polygon included in an input image from a background and distinguishes an outline of the at least one polygon, the shape inference module, when the first image of the first type and the second image of the second type are input, compares a border shape of a polygon included in the first image with a border shape of at least one polygon included in the second image to determine whether the border shape of the polygon matches the border shape of the at least one polygon, and the discriminator module determines whether at least one input image is a real image or a fake image according to the set condition.

According to another aspect of the present disclosure, an image matching method of determining whether images of different types match each other by using an image matching device includes generating a first image of a first type by capturing an image of an object, generating a second image of a second type by applying the first image to a conversion model, and determining whether the second image matches a third image of the second type according to an image matching condition, wherein the object is manufactured by using the third image, the conversion model is machine-trained through a generation module, a separation outline module, a shape inference module, and a discriminator module to convert the first image of the first type into the second image of the second type, the generation module processes the first image of the first type, the separation outline module separates at least one polygon included in an input image from a background and distinguishes an outline of the at least one polygon, the shape inference module, when the first image of the first type and the second image of the second type are input, compares a border shape of a polygon included in the first image with a border shape of at least one polygon included in the second image to determine whether the border shape of the polygon matches the border shape of the at least one polygon, and the discriminator module determines whether at least one input image is a real image or a fake image according to the set condition.

According to the embodiments of the present disclosure described above, a conversion model may be trained without the intervention of an administrator, and thus, images of different types may automatically match each other.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
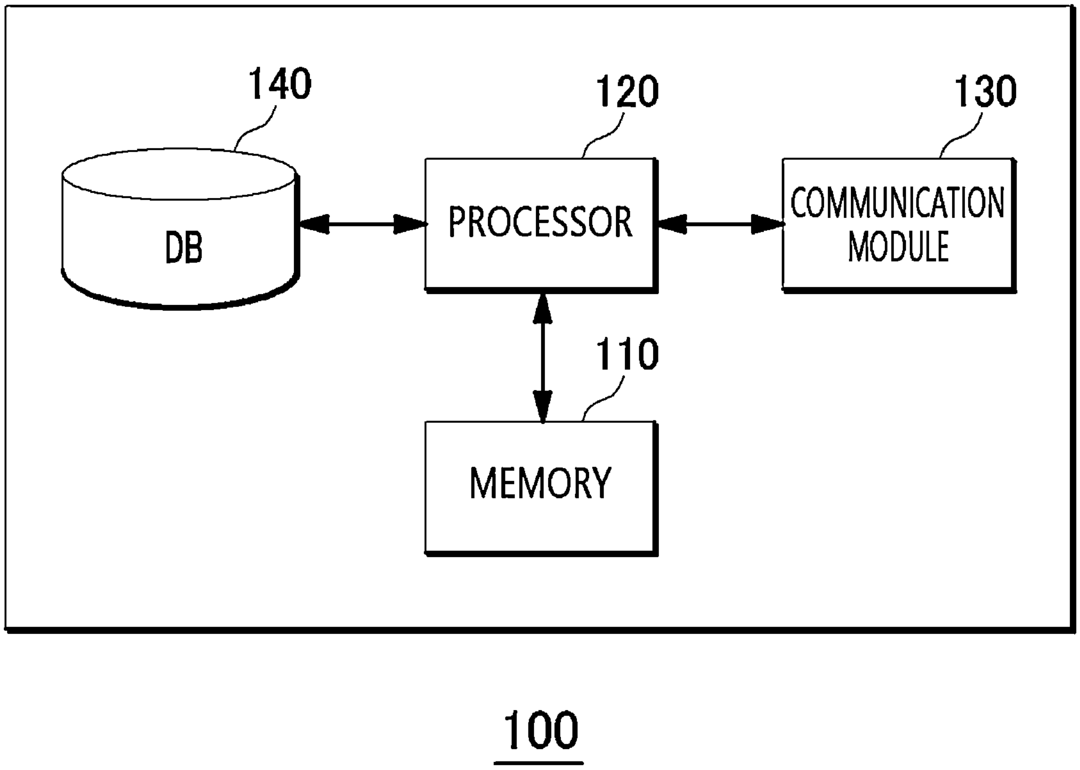
FIG. 1 is a conceptual diagram of a conversion model construction device according to one embodiment of the present disclosure.

Hereafter, the present disclosure will be described in detail with reference to the accompanying drawings. However, the present disclosure may be implemented in many different forms and is not limited to the embodiments described herein. In addition, the accompanying drawings are only for easy understanding of the embodiments disclosed in the present specification, and the technical ideas disclosed in the present specification are not limited by the accompanying drawings. In order to clearly describe the present disclosure in the drawings, parts irrelevant to the descriptions are omitted, and a size, a shape, and a form of each component illustrated in the drawings may be variously modified. The same or similar reference numerals are assigned to the same or similar portions throughout the specification.

Suffixes "module" and "unit" for the components used in the following description are given or used interchangeably in consideration of ease of writing the specification, and do not have meanings or roles that are distinguished from each other by themselves. In addition, in describing the embodiments disclosed in the present specification, when it is determined that a detailed descriptions of related known technologies may obscure the gist of the embodiments disclosed in the present specification, the detailed descriptions are omitted.

Throughout the specification, when a portion is said to be "connected (coupled, in contact with, or combined)" with another portion, this includes not only a case where it is "directly connected (coupled, in contact with, or combined) ", but also a case where there is another member therebetween. In addition, when a portion "includes (comprises or provides)" a certain component, this does not exclude other components, and means to "include (comprise or provide)" other components unless otherwise described.

Terms indicating ordinal numbers, such as first and second, used in the present specification are used only for the purpose of distinguishing one component from another component and do not limit the order or relationship of the components. For example, the first component of the present disclosure may be referred to as the second component, and similarly, the second element may also be referred to as the first component.

FIG. 1 is a block diagram schematically illustrating a conversion model construction device according to an embodiment of the present disclosure.

Referring to FIG. 1, a conversion model construction device 100 according to an embodiment of the present disclosure will be described. The conversion model construction device 100 constructs a conversion model that converts an image of a first type into an image of a second type. To this end, the conversion model construction device 100 includes a memory 110 and a processor 120.

The memory 110 stores a conversion model construction program, and it should be interpreted that the memory 110 includes a nonvolatile storage device that continuously maintains stored information even when power is not supplied and a volatile storage device that requires power to maintain the stored information. The memory 110 may perform a function of temporarily or permanently storing data processed by the processor 120. The memory 110 may include magnetic storage media or flash storage media in addition to the volatile storage device that requires power to maintain the stored information, but the scope of the present disclosure is not limited thereto.

In addition, the processor 120 executes a conversion model construction program stored in the memory 110 to construct a conversion model. In the present embodiment, the processor 120 may be implemented by a microprocessor, a central processing unit (CPU), a processor core, a multi-processor, an application-specific integrated circuit (ASIC), a field programmable gate array (FPGA), or so on, but the scope of the present disclosure is not limited thereto.

FIGS. 2 to 5 are examples illustrating operations of a conversion model construction program. A process in which the conversion model construction program constructs a conversion model is specifically described with reference to FIGS. 2 to 5.

Figure 2:
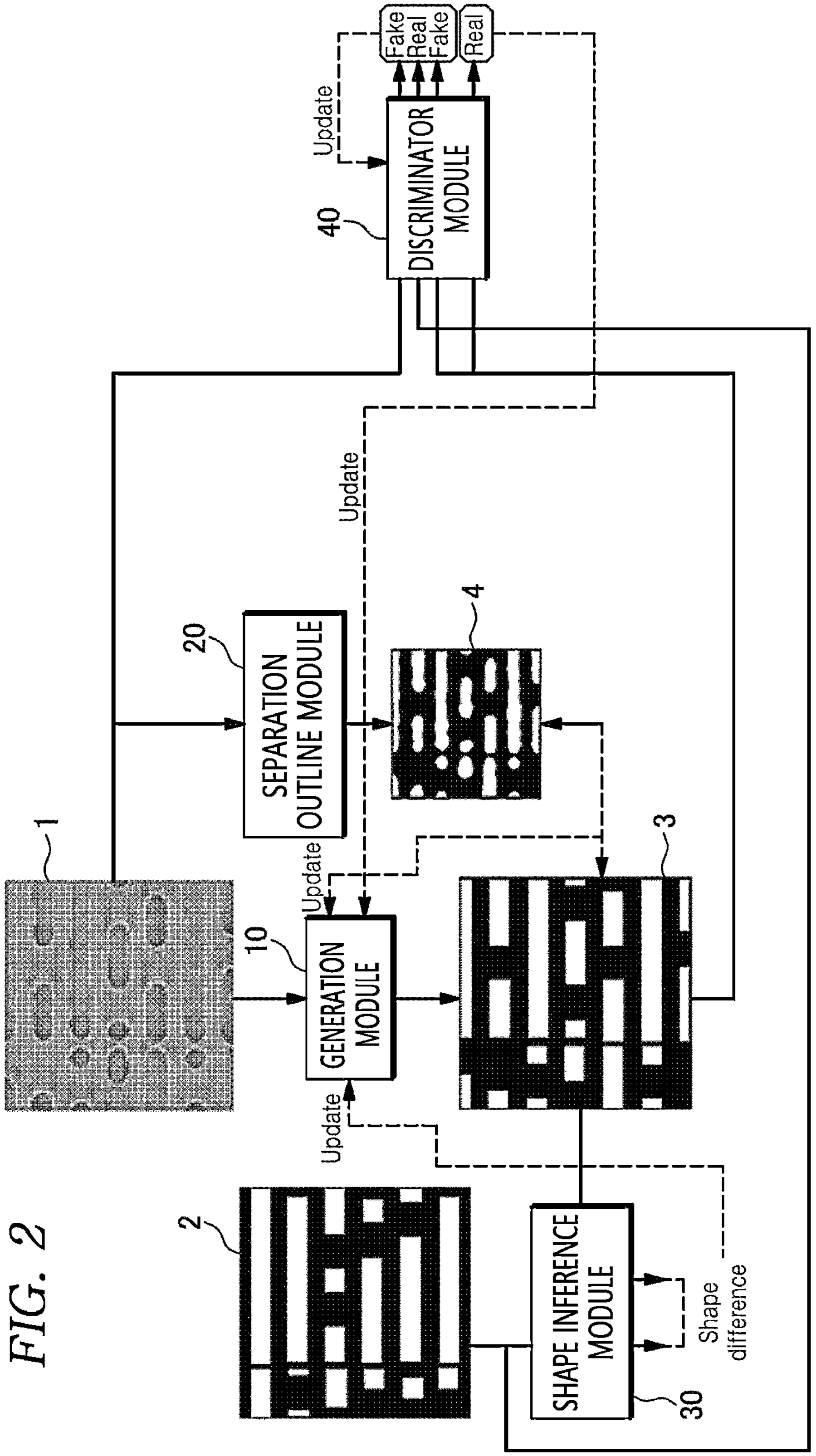
FIG. 2 to FIG. 5 are examples illustrating operations of a conversion model construction program.

First, referring to FIG. 2, a conversion model is trained through unsupervised learning and includes a generation module 10, a separation outline module 20, a shape inference module 30, and a discriminator module 40. The generation module 10 processes an applied image according to setting, and the separation outline module 20 separates at least one polygon included in an input image from a background and distinguishes an outline of the polygon.

In addition, when first and second images of different types are input, the shape inference module 30 compares a border shape of the polygon included in the first image with a border shape of at least one polygon included in the second image to determine whether the shapes match each other, and the discriminator module 40 distinguishes between a real image and a fake image according to a set condition for at least one input image.

The conversion model construction program trains a conversion model that converts a first training image 1 of the first type into an image of the second type by using the generation module 10, the separation outline module 20, the shape inference module 30, the discriminator module 40, the first training image 1 of the first type, and a second training image 2 of the second type. Here, the first training image 1 may be an image of a certain object, for example, an image of a semiconductor obtained by a scanning electron microscope (SEM). In addition, the second training image 2 may be a blueprint of an object, for example, a blueprint of a semiconductor. Therefore, the first type is an SEM image type, the second type is a blueprint image type, and the conversion model is trained to convert the SEM image type into the blueprint image type.

The conversion model construction program updates the generation module 10 to process the first training image 1 of the first type into a conversion image 3 by using the separation outline module 20, updates the generation module 10 to process the conversion image 3 into a shape of the second training image 2 of the second type by using the shape inference module 30, and updates the generation module 10 such that the conversion image 3 is determined as a real image by the discriminator module 40 according to the condition set by the discriminator module 40, and thus, the conversion model is constructed.

Hereinafter, a process of updating the generation module 10 will be described in detail.

Figure 3:
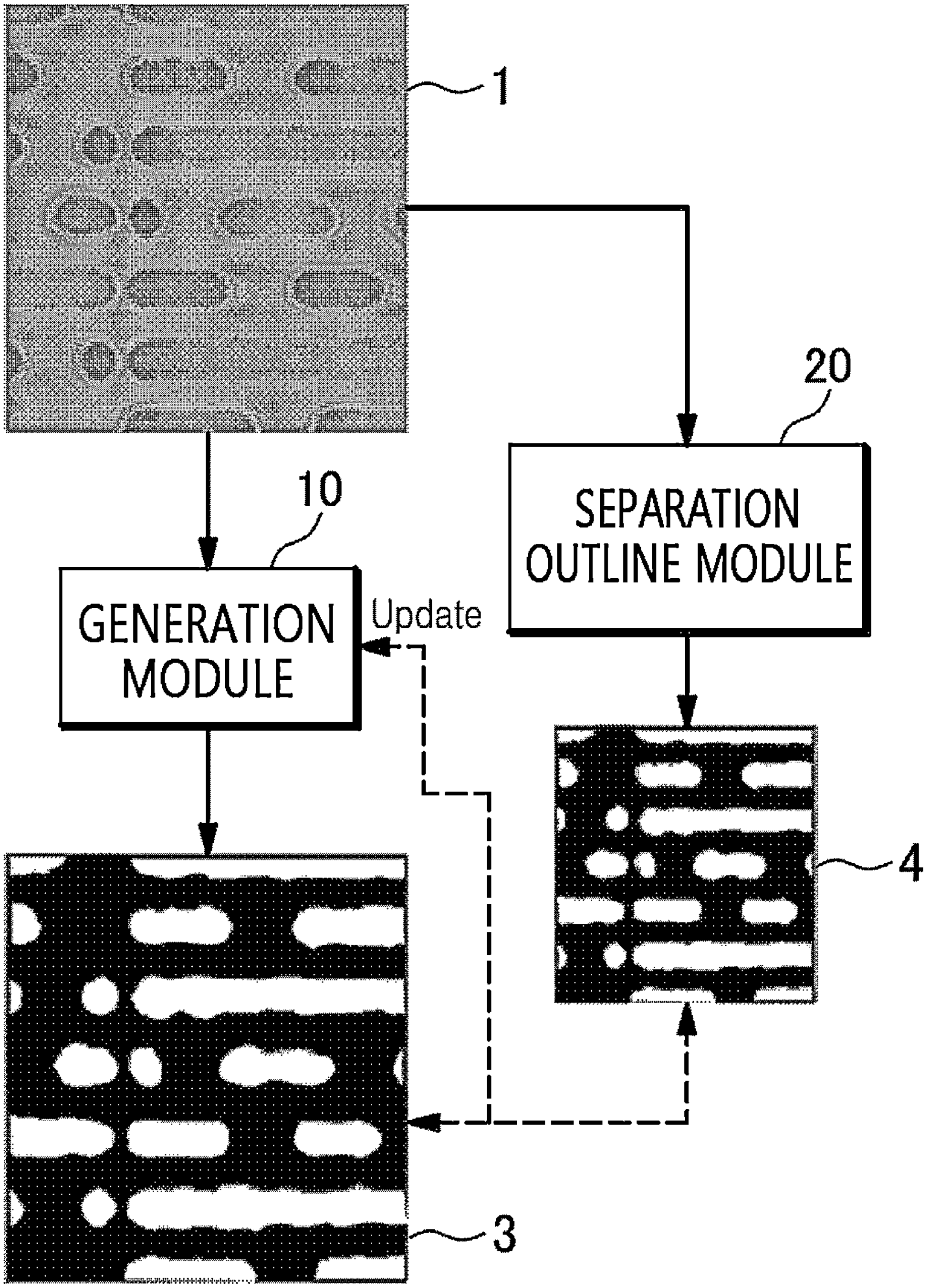

Referring to FIG. 3, in the process of updating the generation module 10 by using the separation outline module 20, the conversion model construction program applies the first training image 1 to the separation outline module 20 to generate a sample image 4 and compares the sample image 4 with the conversion image 3 to determine whether the sample image 4 matches the conversion image 3. Here, the separation outline module 20 separates at least one polygon included in the input image from the background and distinguishes the outline of the polygon, and the sample image 4 generated by the separation outline module 20 is an image obtained by distinguishing the outline by separating polygons included in the input first image 1 from the background.

When shapes of predetermined points of the sample image 4 and the conversion image 3 do not match each other, the conversion model construction program updates the generation module 10 to convert a corresponding point of the conversion image 3 into a shape of the sample image 4. The conversion model construction program repeatedly applies the conversion image 3 to the generation module 10 until the sample image 4 matches the conversion image 3, thereby updating the generation module 10.

The process of updating the generation module 10 by using the shape inference module 30 is described with reference to FIG. 4. When first and second images of different types of are input, the shape inference module 30 compares a border shape of a polygon included in the first image with a border shape of at least one polygon included in the second image and determines whether the shapes match each other. The conversion model construction program applies the second training image 2 and the conversion image 3 to the shape inference module 30, and compares a border shape of at least one first polygon **3*a* included in the conversion image 3 with a border shape of the second polygon 2*a* included in the second training image 2** and determines whether the shapes match each other.

When the border shape of the first polygon **3*a* does not match the border shape of the second polygon 2*a*, the conversion model construction program updates the generation module 10 to convert the border shape of the first polygon 3*a* into the border shape of the second polygon 2*a*. The conversion model building program repeatedly applies the conversion image 3 to the generation module 10 until the border shape of the first polygon 3***a* matches the border shape of the second polygon 2*a*, thereby updating the generation module 10.

Figure 5:
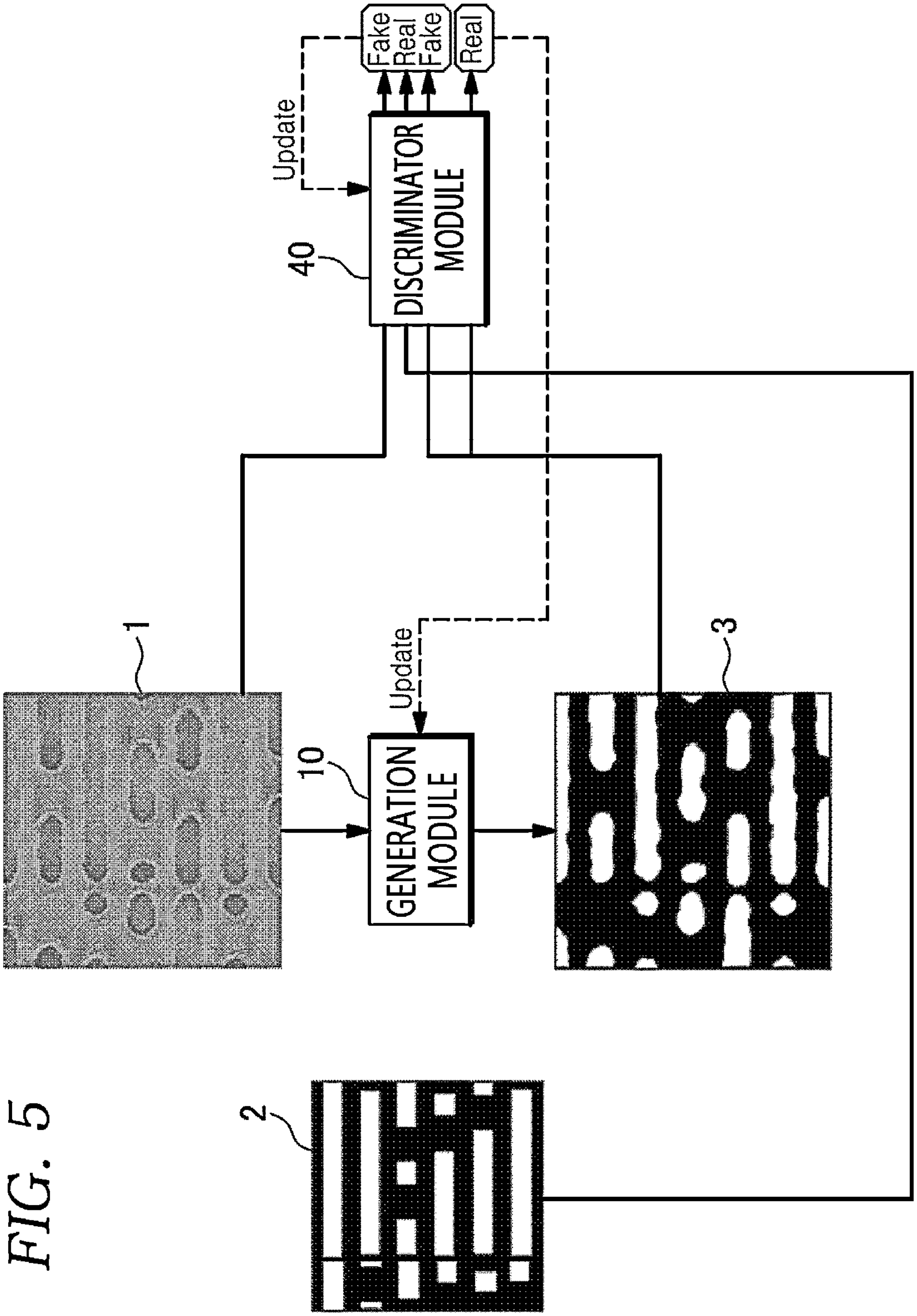

Referring to FIG. 5, the process of updating the generation module 10 by using the discriminator module 40 is described. The discriminator module 40 distinguishes between a real image and a fake image according to a set condition for at least one input image, and the discriminator module 40 is set to recognize the first training image 1 and the conversion image 3 as fake images, and recognize the second training image 2 as a real image. The conversion model construction program updates the generation module 10 by repeatedly applying the conversion image 3 to the generation module 10 until the conversion image 3 is recognized as a real image by the discriminator module 40 and updates the generation module 10 by repeatedly applying the conversion image 3 to the separation outline module 20 and the shape inference module 30 until the conversion image 3 is determined as a real image.

Additionally, the process of updating the generation module 10 by using the separation outline module 20, the process of updating the generation module 10 by using the shape inference module 30, and the process of updating the generation module 10 by using the discriminator module 40 may be performed sequentially or may all be performed simultaneously.

The communication module 130 may perform data communication with an external device and include a device including hardware and software required to transmit and receive signals, such as control signals or data signals, through wired or wireless connections with other network devices.

The database 140 may store various types of data for training or operating a conversion model. For example, a training image for training a conversion model may be stored.

Meanwhile, the conversion model construction device 100 according to one embodiment of the present disclosure may also operate as a server that receives a first training image and a second training image from an external computing device and constructs a conversion model based on the first and second training images.

Figure 6:
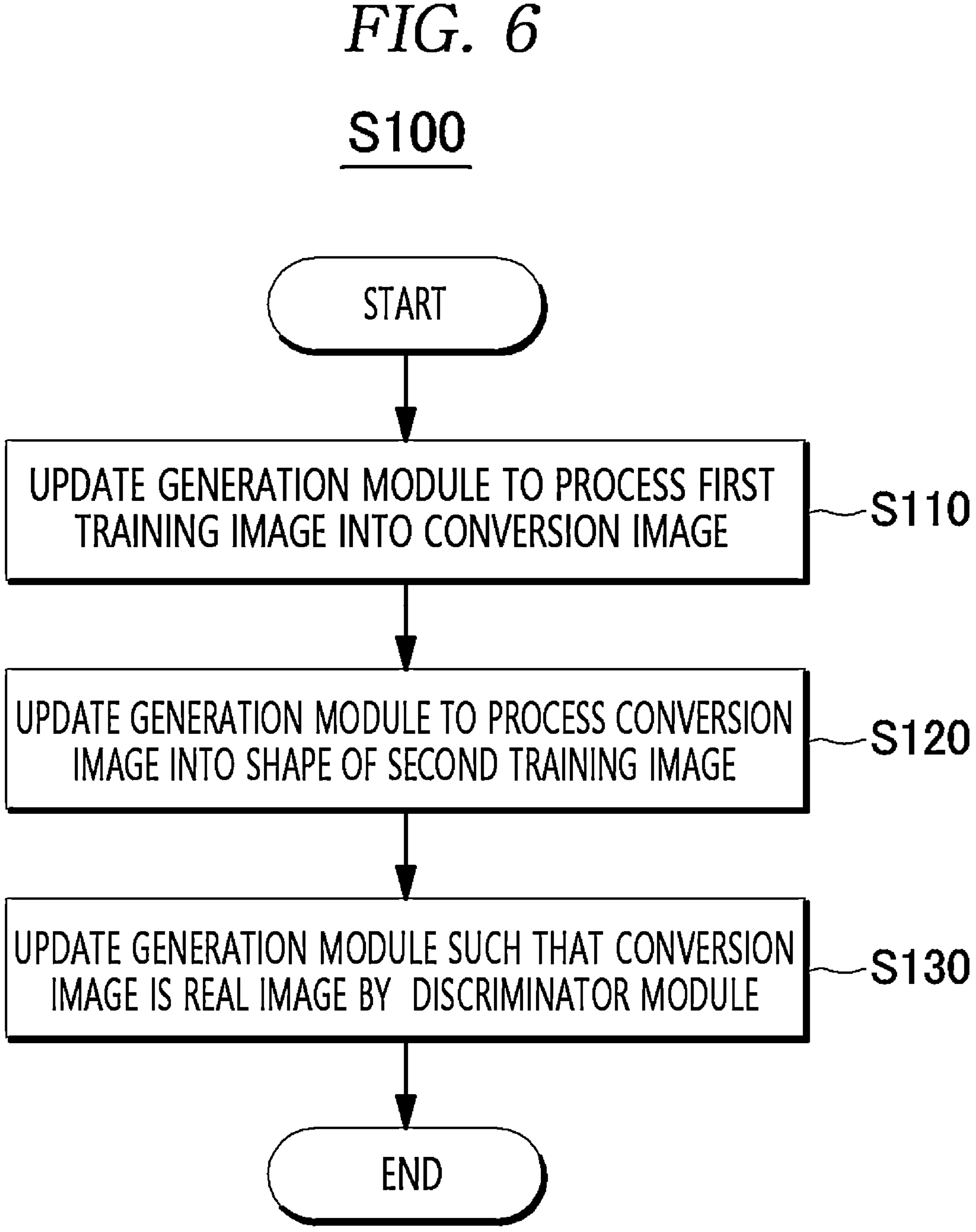
FIG. 6 is a flowchart illustrating a conversion model construction method according to one embodiment of the present disclosure.

FIG. 6 is a flowchart illustrating a conversion model construction method according to one embodiment of the present disclosure, and the present disclosure is a method of constructing a conversion model that converts an image of a first type into an image of a second type by using a conversion model construction device.

Referring to FIGS. 1 to 6, the conversion model construction method according to the present embodiment updates a generation module to process a first training image 1 of a first type into a conversion image 3 by using the separation outline module 20 (step S110), updates the generation module 10 to process the conversion image 3 into a second shape by using the second training image 2 of a second type and the shape inference module 30 (step S120), and updates the generation module 10 such that the conversion image 3 is determined as a real image by the discriminator module 40 according to the condition set by the discriminator module 40 (step S130), thereby training the conversion model.

Hereinafter, details for each process will be described.

First, referring to FIG. 3, in the process (step S110) of updating the generation module 10 by using the separation outline module 20, the first training image 1 is applied to the separation outline module 20 to generate the sample image 4, and the sample image 4 and the conversion image 3 are compared with each other to determine whether the sample image 4 and the conversion image 3 match each other. When shapes of some points of the sample image 4 and the conversion image 3 do not match each other, the generation module 10 is updated to convert a corresponding point of the conversion image 3 into the shape of the sample image 4. This process is repeatedly applied to the generation module 10 until the sample image 4 matches the conversion image 3, and thereby, the generation module 10 is updated.

Figure 4:
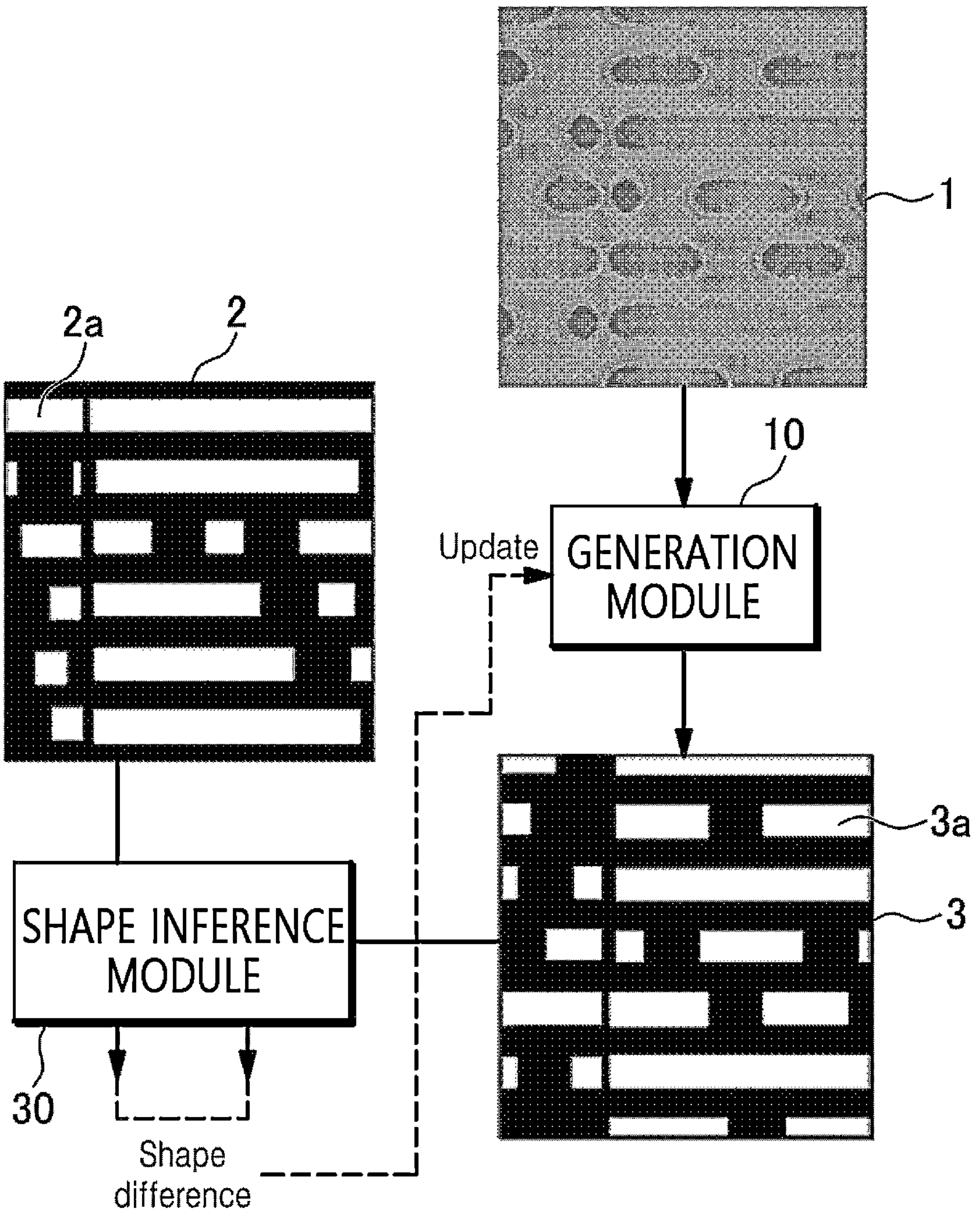

Next, referring to FIG. 4, in the process (step S120) of updating the generation module 10 by using the shape inference module 30, the second training image 2 and the conversion image 3 are applied to the shape inference module 30, and a border shape of at least one first polygon 3*a* included in the conversion image 3 is compared with a border shape of the second polygon 2*a* included in the second training image (2) to determine whether the shapes match each other.

When the border shape of the first polygon 3*a* does not match the border shape of the second polygon 2*a*, the generation module 10 is updated to convert the border shape of the first polygon 3*a* into the border shape of the second polygon 2*a*. The conversion model construction program repeatedly applies the conversion image 3 to the generation module 10 until the border shape of the first polygon 3*a* matches the border shape of the second polygon 2*a*, thereby updating the generation module 10.

Finally, referring to FIG. 5, in the process (step S130) of updating the generation module 10 by using the discriminator module 40, the discriminator module 40 is set to recognize the first training image 1 and the conversion image 3 as fake images and to recognize the second training image 3 as a real image. In addition, the conversion image 3 is repeatedly applied to the generation module 10 until the conversion image 3 is recognized as a real image by the discriminator module 40, and the conversion image 3 is repeatedly applied to the separation outline module 20 and the shape inference module 30 until the conversion image 3 is determined as a real image, and thereby, the generated module 10 is updated.

Additionally, step S110, step S120, and step S130 described above may be performed sequentially or may all be performed simultaneously.

Figure 7:
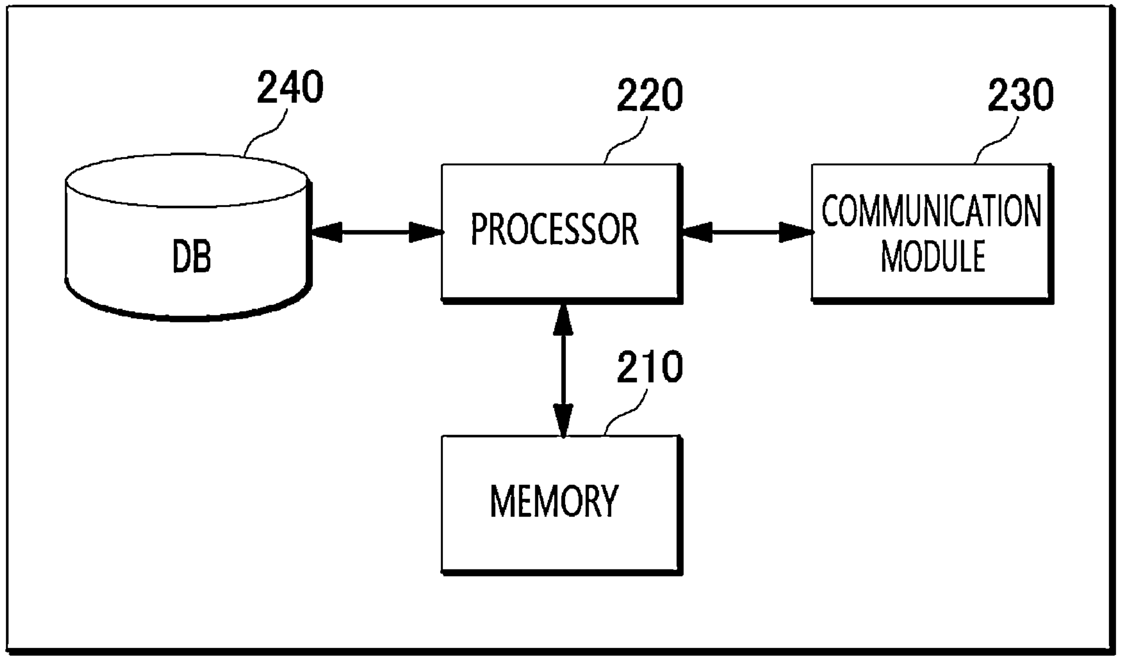
FIG. 7 is a conceptual diagram schematically illustrating an image matching device according to one embodiment of the present disclosure.

FIG. 7 is a block diagram schematically illustrating an image matching device according to an embodiment of the present disclosure.

An image matching device 200 according to an embodiment of the present disclosure will be described with reference to FIG. 7. The image matching device 200 determines whether images of different types match each other. In order to perform this, the image matching device 200 includes a memory 210 and a processor 220.

The memory 210 stores an image matching program. It should be interpreted that the memory 210 includes a nonvolatile storage device that maintains the stored information even when power is not supplied and a volatile storage device that requires power to maintain the stored information. The memory 210 may perform a function of temporarily or permanently storing the data processed by the processor 220. The memory 210 may include magnetic storage media or flash storage media in addition to a volatile storage device that requires power to maintain the stored information, but the scope of the present disclosure is not limited thereto.

Figure 8:
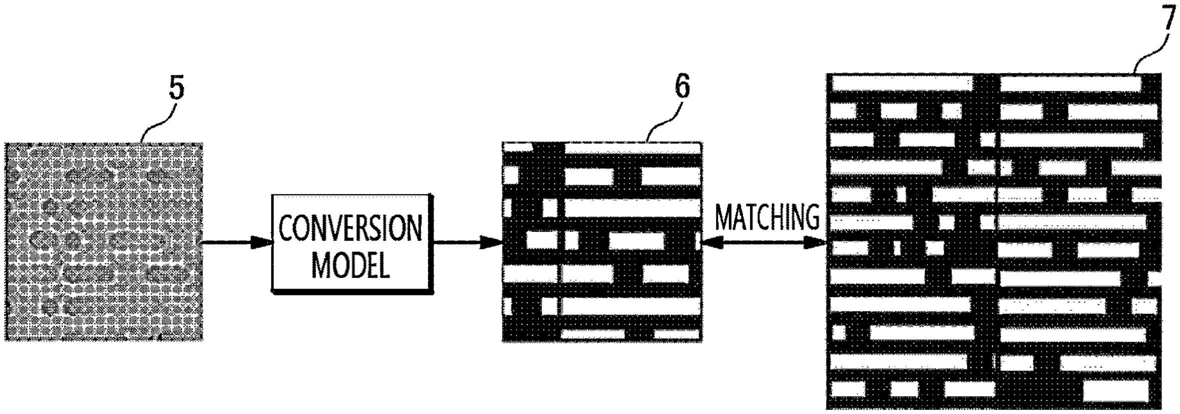
FIG. 8 is an example illustrating an operation of an image matching device according to one embodiment of the present disclosure.

In addition, the processor 220 executes an image matching program stored in the memory 110 to determine whether images of different types match each other Referring to FIG. 8, in an operation of the image matching program, the image matching program applies a first image 5 of a first type of obtained by capturing an image of an object to a conversion model to generate a second image 6 of a second type, and determines whether the second image 6 matches a third image 7 of the second type according to an image matching condition.

Here, the conversion model is machine-trained through a generation module, a separation outline module, a shape inference module, and a discriminator module to convert the first image of the first type into the second image of the second type. The generation module processes the first image of the first type. The separation outline module separates at least one polygon included in an input image from a background and distinguishes the outline of the polygon. When the first and second images of different types are input, the shape inference module compares an outline shape of a polygon included in the first image of the first type with an outline shape of at least one polygon included in the second image of the second type to determine whether the shapes match each other. The discriminator module determines whether at least one input image is real or fake based on a set condition. In addition, an object is manufactured by using the third image 7, and for example, the third image 7 may be a blueprint for manufacturing the object.

FIGS. 9 to 14 are examples illustrating operations of the image matching program. Various embodiments of a process in which the image matching program determines whether the second image matches the third image match will be described with reference to FIGS. 9 to 14.

Figure 9:
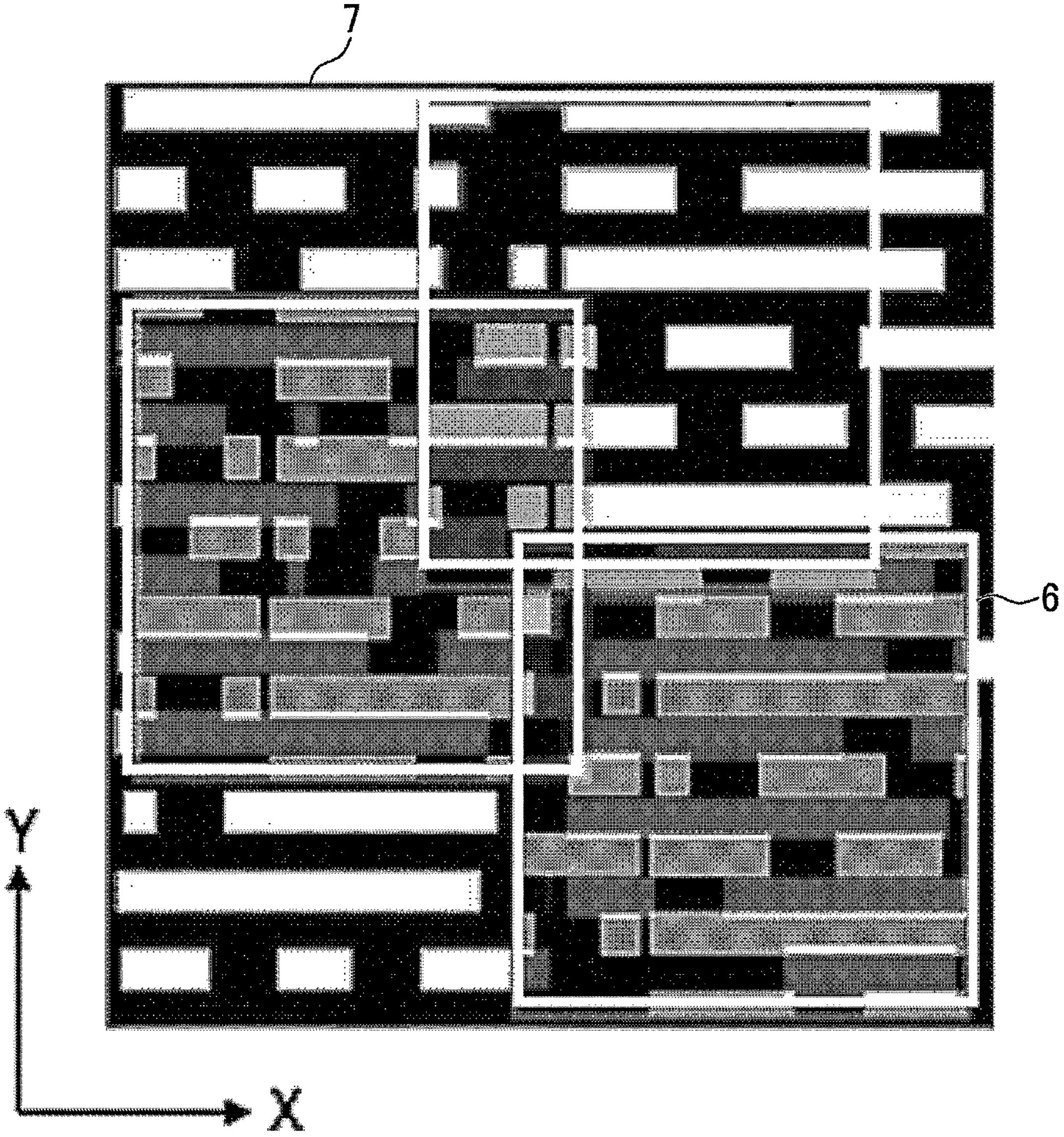
FIG. 9 to FIG. 14 are example illustrating operations of an image matching program.

Referring to FIG. 9, in the process of determining whether the second image 6 matches the third image, according to one embodiment of the present disclosure, an image matching program moves the second image 6 over the third image 7 to search for a corresponding point and determines whether the second image 6 matches the third image 7.

The process of determining whether the second image 6 matches the third image by using the image matching program according to one embodiment of the present disclosure will be specifically described with reference to FIG. 10 and FIG. 11.

Figure 10:
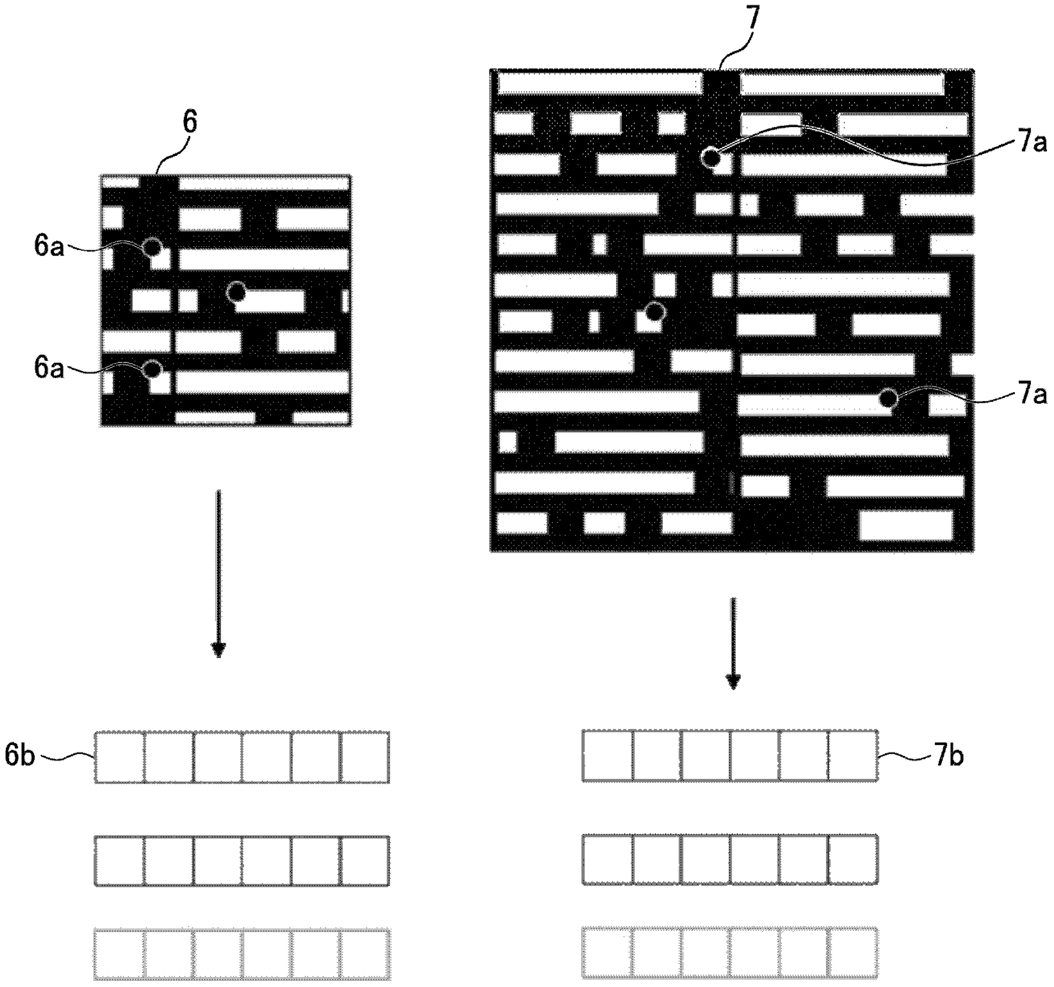

Referring to FIG. 10, the image matching program sets a first matching point 6*a* to at least one of at least one polygon included in the second image 6, and sets a second matching point 7*a* corresponding to the first matching point 6*a* to the third image 7. In addition, the image matching program generates a first feature vector 6*b* including information on the at least one first matching point 6*a*, and generates a second feature vector 7*b* including information on each of the second matching points 7*a*.

Figure 11:
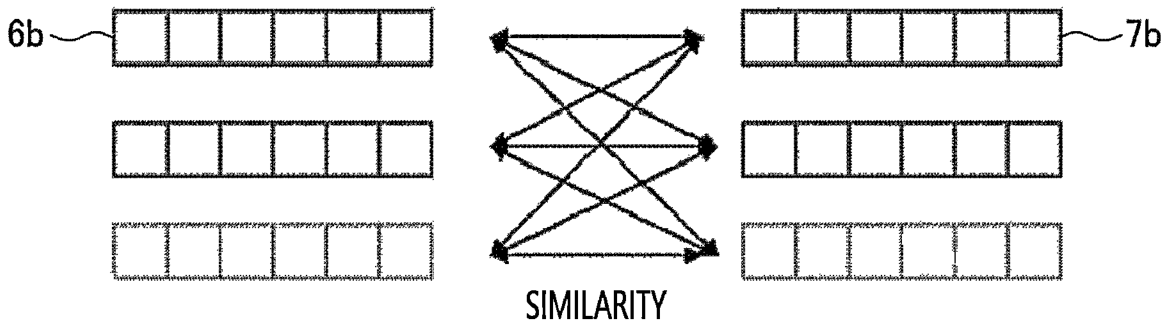

Thereafter, as illustrated in FIG. 11, the image matching program compares the first feature vector 6*a* with the second feature vector 7*b*, and disposes the second image 6 on the third image 7 according to the similarity between the feature vectors, thereby determining whether the second image 6 matches the third image 7.

The process of determining whether the second image 6 matches the third image 7 by using the image matching program according to one embodiment of the present disclosure will be specifically described with reference to FIG. 12 and FIG. 13.

Figure 12:
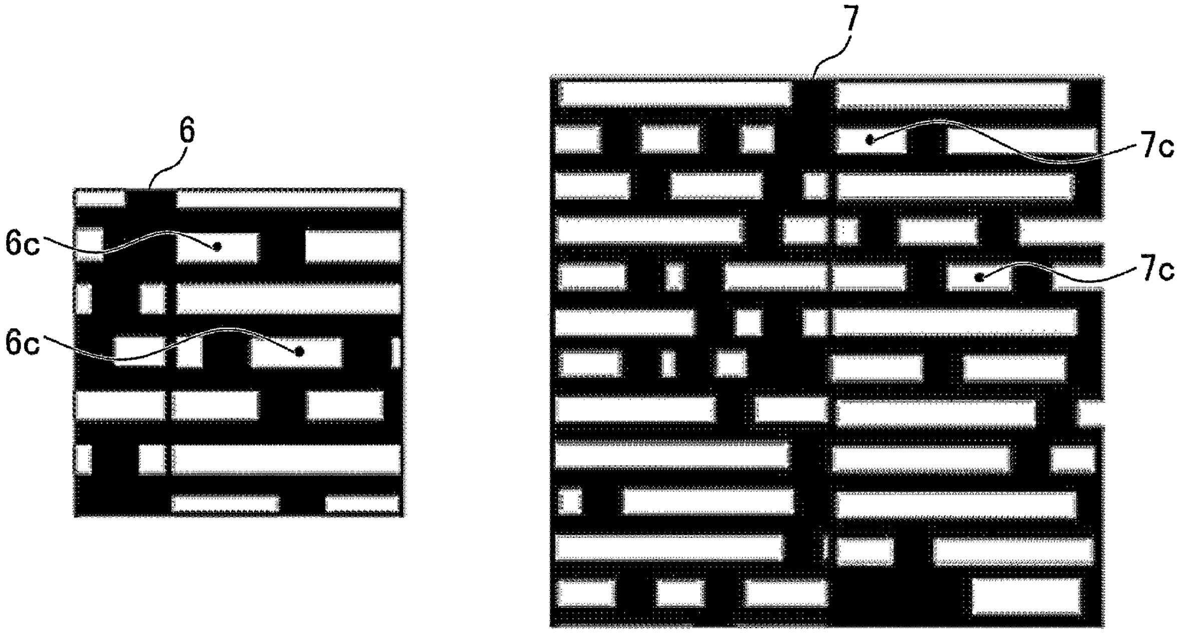

Referring to FIG. 12, the image matching program sets a first center point 6*c* to at least one of polygons included in the second image 6, and sets a second center point 7*c* corresponding to the first center point 6*c* to the third image 7.

Figure 13:
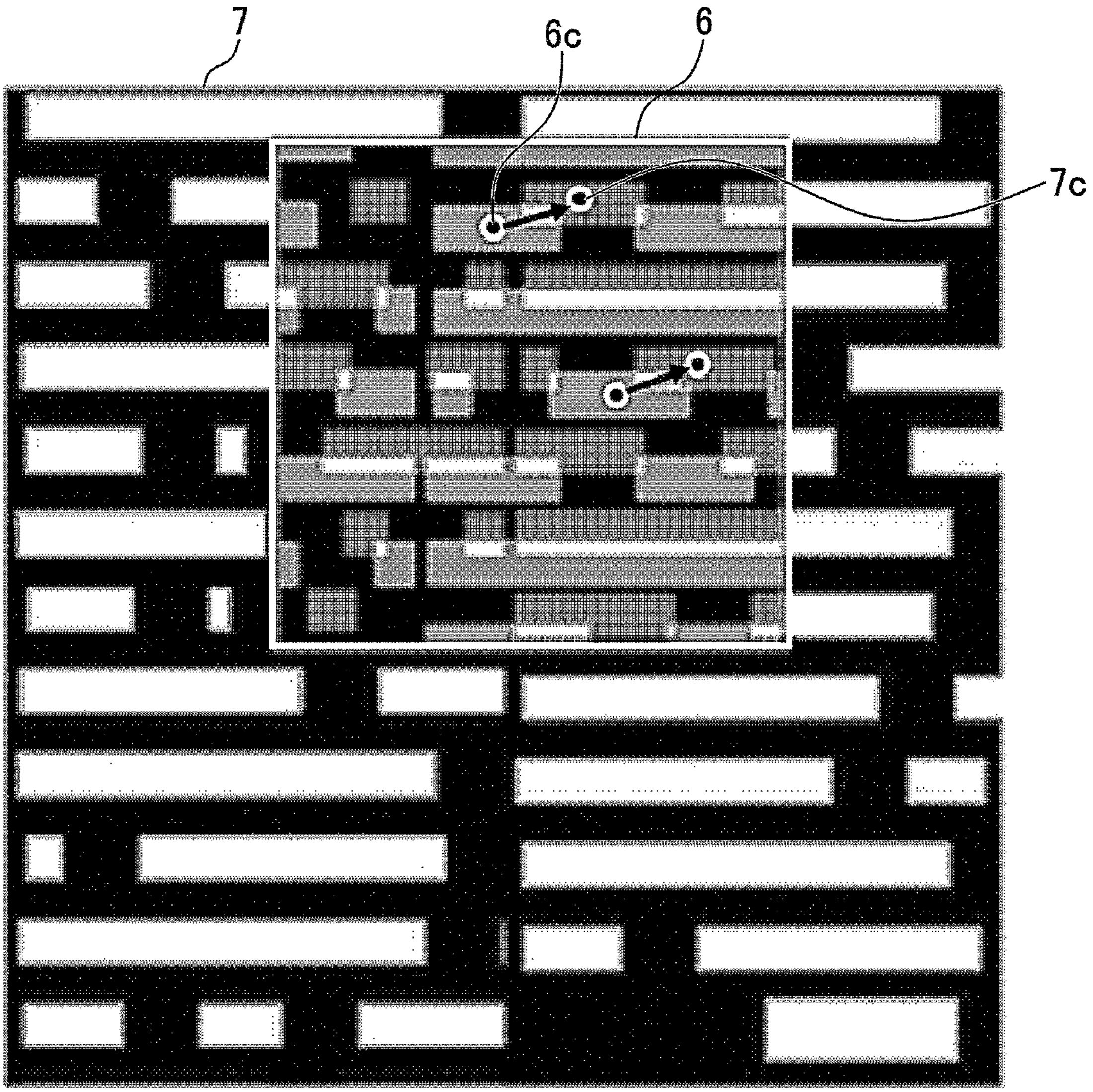

In addition, as illustrated in FIG. 13, the image matching program matches the first center point 6*c* to the second center point 7*c* and determines whether the second image 6 matches the third image 7.

Figure 14:
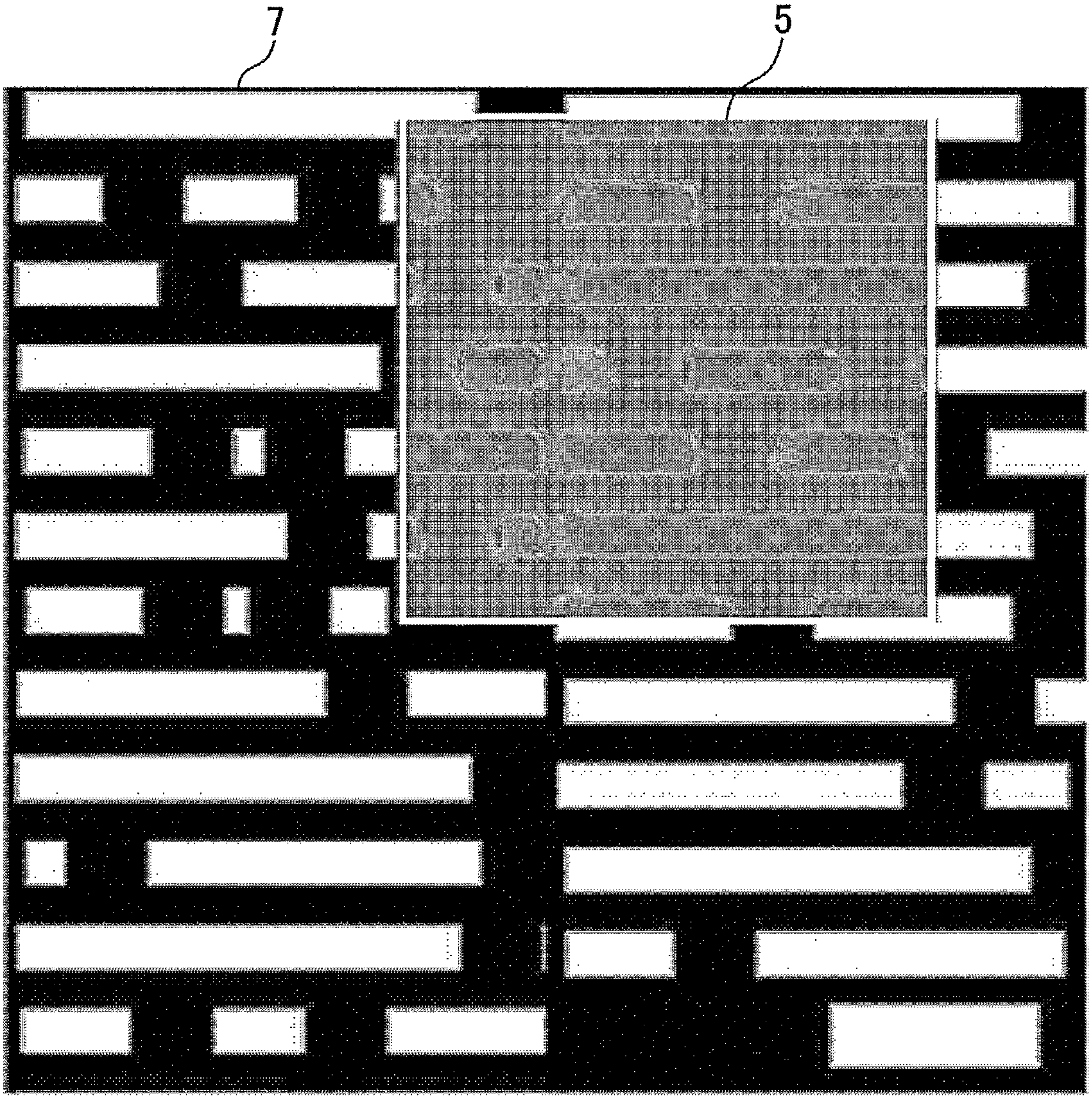

As a result, the image matching program may match the first image 5 on the third image 7 as illustrated in FIG. 14 through the above process.

Additionally, in the present embodiment, the processor 220 may be implemented by a microprocessor, a CPU, a processor core, a multiprocessor, an ASIC, an FPGA, or so on, but the scope of the present disclosure is not limited thereto.

The communication module 230 may include a device including hardware and software required to transmit and receive signals such as control signals or data signals through a wired or wireless connection with another network device in order to perform data communication for signal data with an external device.

The database 240 may store various types of data for an operation of an image matching program. For example, the database 240 may store the data required for an operation of a position information providing program, such as map data for a target space.

Meanwhile, the image matching device 200 may also operate as a server that receives signal data from an external device, inputs the signal data to a conversion model to convert a first image of a first type into a second image of a second type, and determines whether the second image matches a third image of the second type.

Figure 15:
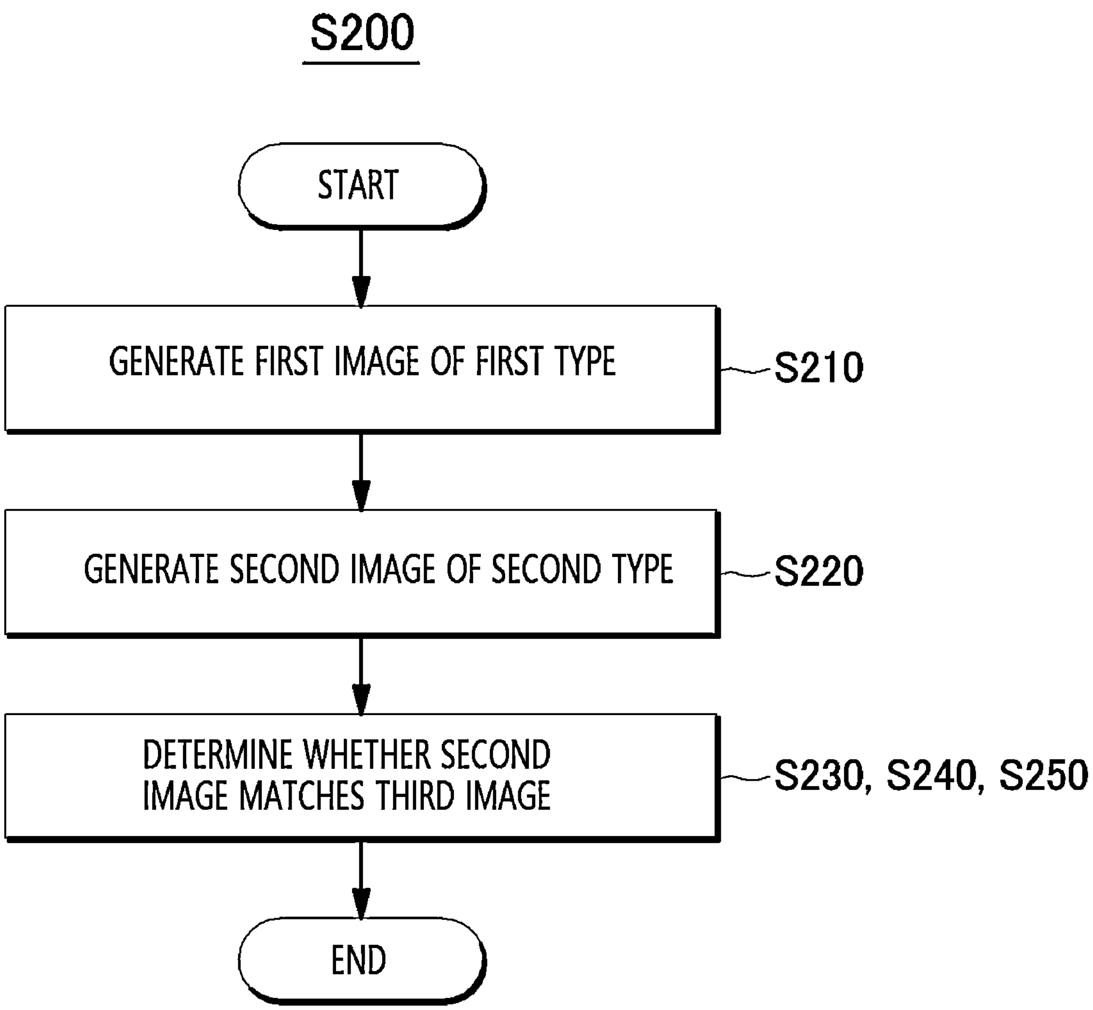
FIG. 15 is a flowchart illustrating an image matching method according to one embodiment of the present disclosure.

FIG. 15 is a flowchart illustrating an image matching method according to one embodiment of the present disclosure.

Referring to FIG. 8 and FIG. 15, in a position information providing method S200 according to the present embodiment, a first image 5 of a first type is generated by capturing an image of an object (step S210), and a second image 6 of the second type is generated by applying the first image 5 to a conversion model (step S220). Thereafter, whether the second image 6 matches the third image 7 of the second type is determined according to an image matching condition (step S230, step S240, and step S250).

Here, the conversion model is machine-trained through a generation module, a separation outline module, a shape inference module, and a discriminator module to convert the first image of the first type into the second image of the second type. The generation module processes the first image of the first type. The separation outline module separates at least one polygon included in an input image from a background and distinguishes the outline of the polygon. When the first image and the second image are input, the shape inference module compares a shape of a polygon in the first image with a shape of a polygon in the second image and determines whether the shapes match each other. The discriminator module determines whether at least one input image is a real image or a fake image based on a set condition. In addition, an object is manufactured by using the third image 7, and for example, the third image 7 may be a blueprint for manufacturing the object.

Hereinafter, various embodiments of the process of determining whether the second image matches the third image (step S230, step S240, and step S250) will be described.

Referring to FIG. 9, in the process of determining whether the second image 6 matches the third image 7 (step S230) according to one embodiment of the present disclosure, an image matching program moves the second image 6 over the third image 7 to search for a corresponding point and determines whether the second image 6 matches the third image 7.

Figure 16:
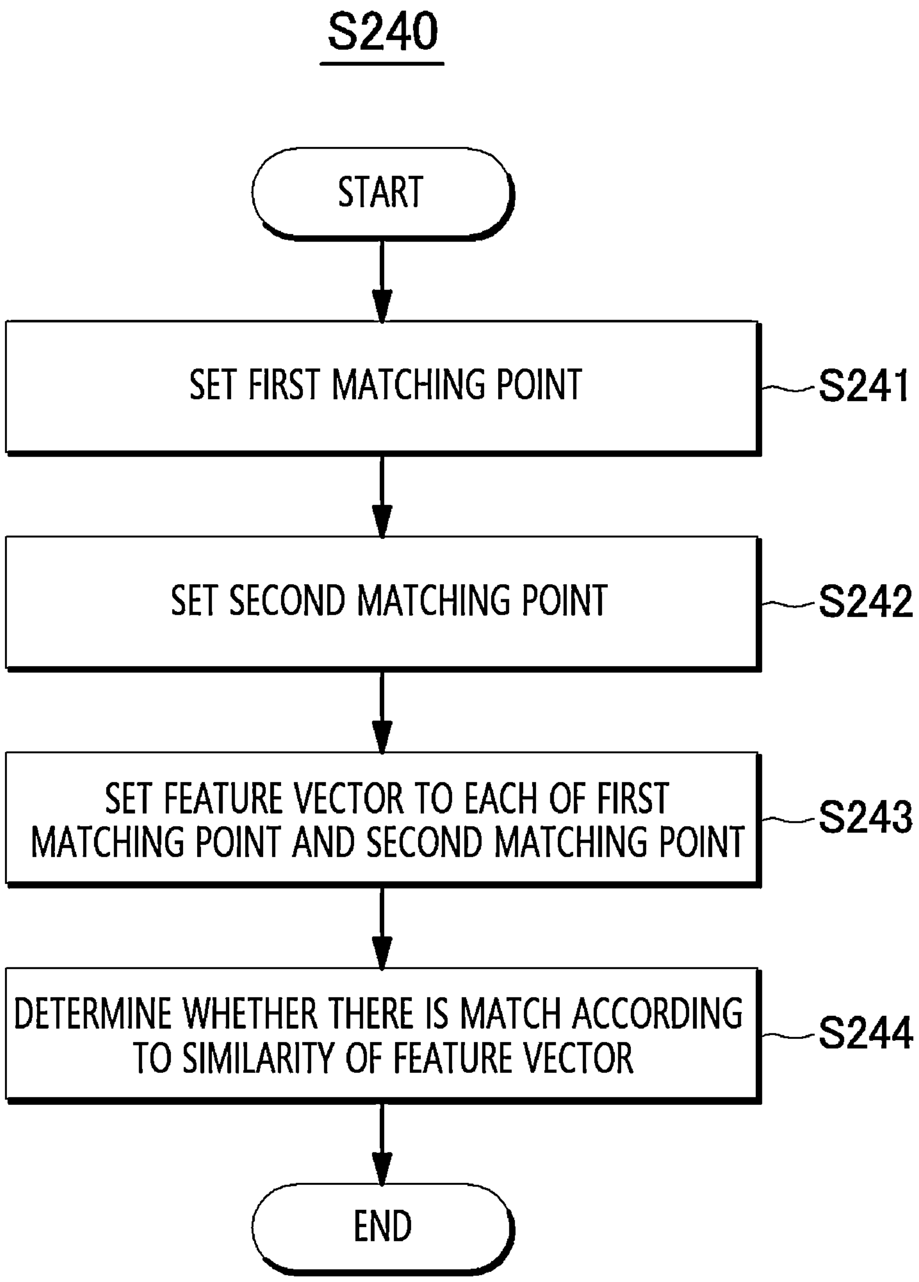
FIG. 16 is a flowchart illustrating a process of determining whether a second image matches a third image as illustrated in FIG. 15.

The process of determining whether the second image 6 matches the third image 7 step S240) according to one embodiment of the present disclosure will be specifically described with reference to FIG. 10, FIG. 11, and FIG. 16.

Referring to FIG. 10, the image matching program sets the first matching point 6*a* to at least one of at least one polygon included in the second image 6 (step S241), and sets the second matching point 7*a* corresponding to the first matching point 6*a* to the third image 7 (step S242). In addition, the image matching program generates the first feature vector 6*b* including information on at least one the first matching points 6*a* and generates the second feature vector 7*b* including information on each of the second matching points 7*a* (step S243).

Thereafter, as illustrated in FIG. 11, the image matching program compares the first feature vector 6*a* with the second feature vector 7*b*, disposes the second image 6 on the third image 7 according to similarity between the feature vectors, and determines whether the second image 6 matches the third image (step S244).

Figure 17:
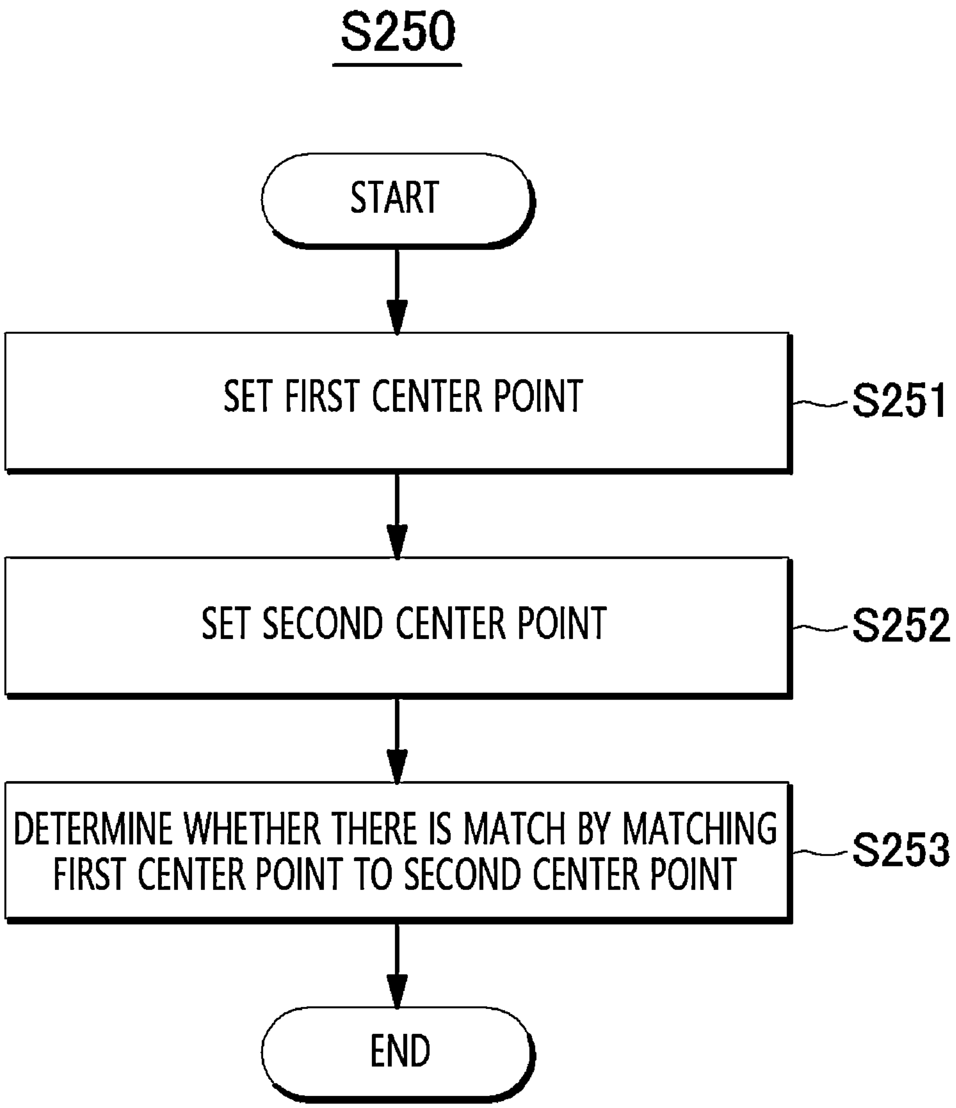
FIG. 17 is a flowchart illustrating a process of determining whether the second image matches the third image as illustrated in FIG. 15.

A process of determining whether the second image 6 matches the third image 7 by using the image matching program according to one embodiment of the present disclosure (step S250) will be specifically described with reference to FIG. 12, FIG. 13, and FIG. 17.

Referring to FIG. 12, the image matching program sets the first center point 6*c* to at least one of polygons included in the second image 6 (step S251), and sets the second center point 7*c* corresponding to the first center point 6*c* to the third image (step S252).

Then, as illustrated in FIG. 13, the first center point 6*c* and the second center point 7*c* are matched to each other to determine whether the second image 6 matches the third image 7 (step S253).

As a result, according to the image matching method (S200) of the present disclosure, the first image 5 may be matched onto the third image 7 as illustrated in FIG. 9 through the above process. After image is aligned through such image matching, the degree of product combination may be determined based on a difference between a blueprint and an actually manufactured product.

The present disclosure may be performed in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium. A computer storage medium includes both volatile and nonvolatile media and removable and non-removable media implemented by any method or technology for storing information, such as computer readable instructions, data structures, program modules or other data.

In addition, although the method and system of the present disclosure are described with respect to specific embodiments, some or all of components or operations thereof may be implemented by using a computer system having a general-purpose hardware architecture.

those skilled in the art to which the present disclosure belongs will understand that the present disclosure may be easily modified into another specific form based on the descriptions given above without changing the technical idea or essential features of the present disclosure. Therefore, the embodiments described above should be understood as illustrative in all respects and not limiting. The scope of the present disclosure is indicated by the claims described below, and all changes or modified forms derived from the meaning, scope of the claims, and their equivalent concepts should be interpreted as being included in the scope of the present disclosure.

The scope of the present application is indicated by the claims described below rather than the detailed description above, and all changes or modified forms derived from the meaning, scope of the claims, and their equivalent concepts should be interpreted as being included in the scope of the present application.

What is claimed is:

1. A conversion model construction device for constructing a conversion model for converting a type of an image, the conversion model construction device comprising:

a memory storing a conversion model construction program; and a processor configured to execute the conversion model construction program, wherein the conversion model construction program updates a generation module to process a first training image of a first type into a conversion image by using a separation outline module, updates the generation module to process the conversion image into a shape of a second training image of a second type by using a shape inference module, and trains the conversion model by updating the generation module such that the conversion image is determined as a real image by a discriminator module according to a condition set by the discriminator module, the conversion model includes the generation module, the separation outline module, the shape inference module, and the discriminator module, the separation outline module separates at least one polygon included in an input image from a background and distinguishes an outline of the at least one polygon, the shape inference module, when the first image of the first type and the second image of the second type are input, compares a border shape of a polygon included in the first image with a border shape of at least one polygon included in the second image to determine whether the border shape of the polygon matches the border shape of the at least one polygon, and the discriminator module determines whether at least one input image is a real image or a fake image according to the set condition.

2. The conversion model construction device of claim 1, wherein the conversion model construction program generates a sample image by applying the first training image to the separation outline module, and compares the sample image with the conversion image to determine whether the sample image matches the conversion image.

3. The conversion model construction device of claim 2, wherein, when a shape of the sample image does not match a shape of a point of the conversion image, the conversion model construction program updates the generation module to convert the point of the conversion image into the shape of the sample image.

4. The conversion model construction device of claim 3, wherein the conversion model construction program updates the generation module by repeatedly applying the conversion image to the generation module until the sample image matches the conversion image.

5. The conversion model construction device of claim 1, wherein the conversion model construction program applies the second training image and the conversion image to the shape inference module, compares a border shape of at least one first polygon included in the conversion image with a border shape of a second polygon included in the second training image, and determines whether the border shape of the at least one first polygon matches the border shape of the second polygon.

6. The conversion model construction device of claim 5, wherein when the border shape of the at least one first polygon does not match the border shape of the second polygon, the conversion model construction program updates the generation module to convert the border shape of the at least first polygon into the border shape of the second polygon.

7. The conversion model construction device of claim 6, wherein the conversion model construction device updates the generation module by repeatedly applying the conversion image to the generation module until the border shape of the at least first polygon matches the border shape of the second polygon.

8. The conversion model construction device of claim 1, wherein the discriminator module is set to determine the first training image and the conversion image as fake images and to determine the second training image as a real image, and the conversion model construction program updates the generation module by repeatedly applying the conversion image to the generation module until the conversion image is determined as a real image by the discriminator module.

9. The conversion model construction device of claim 8, wherein the conversion model construction program updates the generation module by repeatedly applying the conversion image to the separation outline module and the shape inference module until the conversion image input to the discriminator module is determined as a real image.

10. The conversion model construction device of claim 1, wherein the conversion model is trained through unsupervised learning.

11. A conversion model construction method of converting a type of an image by using a conversion model construction device, the conversion model construction method comprising:

updating a generation module to process a first training image of a first type into a conversion image by using a separation outline module;

updating the generation module to process the conversion image into a second type by using a second training image of a second type and a shape inference module; and updating the generation module such that the conversion image is determined as a real image by a discriminator module according to a condition set by the discriminator module, wherein the conversion model includes the generation module, the separation outline module, the shape inference module, and the discriminator module, the separation outline module separates at least one polygon included in an input image from a background and distinguishes an outline of the at least one polygon, the shape inference module, when the first image of the first type and the second image of the second type are input, compares a border shape of a polygon included in the first image with a border shape of at least one polygon included in the second image to determine whether the border shape of the polygon matches the border shape of the at least one polygon, and the discriminator module determines whether at least one input image is a real image or a fake image according to the set condition.

12. The conversion model construction method of claim 11, wherein, in the updating of the generation module to process the first training image of the first type into the conversion image, a sample image is generated by applying the first training image to the separation outline module, and the sample image is compared with the conversion image to determine whether the sample image matches the conversion image.

13. The conversion model construction method of claim 12, wherein, in the updating of the generation module to process the first training image of the first type into the conversion image, when a shape of the sample image does not match a shape of a point of the conversion image, the generation module is updated to convert the point of the conversion image into the shape of the sample image.

14. The conversion model construction method of claim 13, wherein, in the updating of the generation module to process the first training image of the first type into the conversion image, the generation module is updated by repeatedly applying the conversion image to the generation module until the sample image matches the conversion image.

15. The conversion model construction method of claim 11, wherein, in the updating of the generation module to process the conversion image into the second type, the second training image and the conversion image are applied to the shape inference module, a border shape of at least one first polygon included in the conversion image is compared with a border shape of a second polygon included in the second training image, and whether the border shape of the at least one first polygon matches the border shape of the second polygon is determined.

16. The conversion model construction method of claim 15, wherein, in the updating of the generation module to process the conversion image into the second type, when the border shape of the at least one first polygon does not match the border shape of the second polygon, the generation module is updated to convert the border shape of the at least first polygon into the border shape of the second polygon.

17. The conversion model construction method of claim 16, wherein, in the updating of the generation module to process the conversion image into the second type, the generation module is updated by repeatedly applying the conversion image to the generation module until the border shape of the at least first polygon matches the border shape of the second polygon.

18. The conversion model construction method of claim 11, wherein, in the updating of the generation module such that the conversion image is determined as a real image, the discriminator module is set to determine the first training image and the conversion image as fake images and to determine the second training image as a real image, and the generation module is updated by repeatedly applying the conversion image to the generation module until the conversion image is determined as a real image by the discriminator module.

19. The conversion model construction method of claim 18, wherein, in the updating of the generation module such that the conversion image is determined as a real image, the generation module is updated by repeating the updating of the generation module to process the first training image of the first type into the conversion image and the updating of the generation module to process the conversion image into the second type until the conversion image input to the discriminator module is determined as a real image.

20. The conversion model construction method of claim 11, wherein the conversion model is trained through unsupervised learning.

21. An image matching device for determining whether images of different types match to each other, the image matching device comprising:

a memory storing an image matching program; and a processor configured to execute the image matching program, wherein the image matching program generates a second image of a second type by applying a first image of a first type of an object to a conversion model and determines whether the second image matches a third image of the second type according to an image matching condition, the object is manufactured by using the third image, the conversion model is machine-trained through a generation module, a separation outline module, a shape inference module, and a discriminator module to convert the first image of the first type into the second image of the second type, the generation module processes the first image of the first type, the separation outline module separates at least one polygon included in an input image from a background and distinguishes an outline of the at least one polygon, the shape inference module, when the first image of the first type and the second image of the second type are input, compares a border shape of a polygon included in the first image with a border shape of at least one polygon included in the second image to determine whether the border shape of the polygon matches the border shape of the at least one polygon, and the discriminator module determines whether at least one input image is a real image or a fake image according to the set condition.

22. The image matching device of claim 21, wherein the image matching program moves the second image over the third image to search for a corresponding point and determines whether the second image matches the third image.

23. The image matching device of claim 22, wherein the image matching program sets a first matching point to at least one of at least one polygon included in the second image, sets a second matching point corresponding to the first matching point in the third image, and generates a feature vector including information on each of at least one of first matching point and the second matching point.

24. The image matching device of claim 23, wherein the image matching program compares the feature vector of the at least one first matching point with a feature vector of the second matching point, and matches the second image onto the third image according to similarity between the feature vectors to determine whether the second image matches the third image match.

25. The image matching device of claim 21, wherein the image matching program sets a first center point to at least one of the at least one polygon included in the second image, and sets a second center point corresponding to the first center point in the third image.

26. The image matching device of claim 25, wherein the image matching program matches the first center point to the second center point to determine whether the second image matches the third image.

27. An image matching method of determining whether images of different types match each other by using an image matching device, the image matching method comprising:

generating a first image of a first type by capturing an image of an object;

generating a second image of a second type by applying the first image to a conversion model; and determining whether the second image matches a third image of the second type according to an image matching condition, wherein the object is manufactured by using the third image, the conversion model is machine-trained through a generation module, a separation outline module, a shape inference module, and a discriminator module to convert the first image of the first type into the second image of the second type, the generation module processes the first image of the first type, the separation outline module separates at least one polygon included in an input image from a background and distinguishes an outline of the at least one polygon, the shape inference module, when the first image of the first type and the second image of the second type are input, compares a border shape of a polygon included in the first image with a border shape of at least one polygon included in the second image to determine whether the border shape of the polygon matches the border shape of the at least one polygon, and the discriminator module determines whether at least one input image is a real image or a fake image according to the set condition.

28. The image matching method of claim 27, wherein, in the determining whether the second image matches a third image, a point matching the second image is searched on the third image to determine whether the second image matches the third image.

29. The image matching method of claim 27, wherein the determining whether the second image matches a third image includes:

setting a first matching point to at least one of the at least one polygon included in the second image;

setting a second matching point corresponding to the first matching point in the third image; and generating a feature vector including information on each of at least one of first matching point and the second matching point.

30. The image matching method of claim 29, wherein the determining whether the second image matches a third image further includes comparing the feature vector of the at least one first matching point with a feature vector of the second matching point, and matching the second image onto the third image according to similarity between the feature vectors to determine whether the second image matches the third image match.

31. The image matching method of claim 27, wherein the determining whether the second image matches a third image includes:

setting a first center point to at least one of the at least one polygon included in the second image;

setting a second center point corresponding to the first center point in the third image; and matching the first center point to the second center point to determine whether the second image matches the third image.

* * * * *